United States Patent [19]

Statz

[11] Patent Number: 5,562,989
[45] Date of Patent: Oct. 8, 1996

[54] METHOD OF PROTECTING METAL AGAINST CORROSION WITH THERMOPLATIC COATINGS

[75] Inventor: Robert J. Statz, Kennett Square, Pa.

[73] Assignee: E. I. Du Pont de Nemours and Company, Wilmington, Del.

[21] Appl. No.: 387,638

[22] Filed: Feb. 13, 1995

Related U.S. Application Data

[63] Continuation-in-part of Ser. No. 119,521, Sep. 14, 1993, abandoned, which is a continuation of Ser. No. 931,372, Aug. 18, 1992, abandoned.

[51] Int. Cl.$^6$ .............................. B32B 33/00; B32B 9/00; B32B 27/00; C04B 9/02
[52] U.S. Cl. .................. 428/402; 106/14.05; 106/14.14; 106/14.41; 428/461
[58] Field of Search ...................... 428/402, 546, 428/457, 461, 423.5, 615, 658; 422/7; 106/14.27, 14.05, 14.13, 14.41, 14.14; 524/439; 526/273

[56] References Cited

U.S. PATENT DOCUMENTS

| | | | |
|---|---|---|---|
| 3,201,497 | 8/1965 | Heino | 260/837 |
| 3,264,272 | 8/1966 | Rees | 260/78.5 |
| 3,780,140 | 12/1973 | Hammer | 260/884 |
| 3,941,609 | 3/1976 | Stern | 106/290 |
| 4,349,654 | 9/1982 | Ohmae et al. | 526/273 |
| 4,891,394 | 1/1990 | Savin | 523/442 |
| 5,023,120 | 6/1991 | Akao | 428/35.9 |
| 5,091,260 | 2/1992 | Wong | 428/461 |
| 5,115,064 | 5/1992 | Jung et al. | 526/301 |
| 5,185,188 | 2/1993 | Abe et al. | 427/533 |
| 5,334,631 | 8/1994 | Durand | 523/459 |

*Primary Examiner*—Paul J. Thibodeau
*Assistant Examiner*—Stephen Sand
*Attorney, Agent, or Firm*—Peter A. Fowell

[57] ABSTRACT

A method of protecting metals against corrosion involves applying to the metal a thermoplastic coating based on copolymers of ethylene with a glycidyl comonomer, optionally containing a filler such as zinc powder or flake. The method may involve use of the coating alone, or as a primer coating with an outer coating of an olefin-based polymer.

3 Claims, No Drawings

METHOD OF PROTECTING METAL AGAINST CORROSION WITH THERMOPLATIC COATINGS

This is a continuation-in-part, of application Ser. No. 08/119,521 filed Sep. 14, 1993, now abandoned which was a continuation of application Ser. No. 07/931,372 filed Aug. 18. 1992, now abandoned.

BACKGROUND OF INVENTION

1. Field of Invention

This invention relates to thermoplastic anti-corrosion coatings, particularly primer coatings for metals. More particularly, it relates to copolymers of ethylene with a co-monomer containing a glycidyl group, optionally with a filler such as zinc, which can be applied as a thermoplastic coating to prevent corrosion of metals. The coating may be used alone as a sole coating but preferably is used as a primer coating under an outer coating that provides mechanical protection for the primer coating.

2. Background Discussion and Related Art

Metal vessels, pipes and other forms used for containing and transporting a variety of materials are subject to corrosion or erosion by the contained or transported materials. Metal objects are also subject to corrosion or erosion by the environment with which they come into contact. For example, soil, salt water or atmospheric and climatic conditions can have a harsh effect on metal.

To protect against such corrosion and erosion, metals are commonly coated with plastic materials. In addition to providing protection against corrosion or erosion, certain plastic coatings provide desirable properties inherent in the plastic being used. For example, a very smooth surface can reduce the coefficient of friction in a pipe thus reducing the energy needed to pump a fluid through the pipe.

To provide effective protection against corrosion, a coating should have good adhesion to the metal and should be relatively impermeable to agents which could, in themselves, cause corrosion of the metal or to agents which cause a loss of adhesion of the coating to the metal. Poor initial adhesion or subsequent loss of adhesion will allow the metal itself to become directly exposed to corrosive environments. Thus, both impermeability and long term adhesion are important characteristics of a good corrosion-prevention coating.

Coating materials differ in their advantages, however. Polyolefin thermoplastic coatings such as polyethylene or polypropylene are resistant to water and chemicals, but they do not adhere well to metals. By contrast, ethylene copolymer ionomers, which are ion-neutralized ethylene (meth)acrylic acid copolymers, provide a high level of adhesion to metals, are tough and provide good abrasion resistance, but are water sensitive and permeable.

Adhesion and permanence of that adhesion to metals are complex phenomena. Loss of adhesiveness may be due to mechanical or chemical causes. Differential thermal expansion of the metal and the coating can cause mechanical failure of the bond between them, while many agents can attack the metal-coating bond.

Since all of the qualities of a good coating (relative impermeability to potentially corrosive agents plus good and lasting adherence under a wide range of conditions) are not always possible in one coating, it is common to use primer coatings between the metal and an outer plastic coating to provide permanent adhesion between the metal and outer coating, yet maintain the advantages of the outer coating.

Thermoset epoxy primers or sole coatings are known and among the preferred materials for primers or sole coatings. Thermosets have the advantage of relatively low coefficient of expansion and less differential coefficient of expansion with metals. They are, however, quite brittle and are therefore used in quite thin layers. Moreover, they must be cured. Thermoset epoxy resins are excellent adhesives but do not necessarily provide ideal coatings for many purposes.

Particulate fillers, particularly those laminar in shape, are commonly used in coatings to improve corrosion resistance. They aid in reducing differential coefficient of expansion and may reduce permeability by increasing tortuosity of the path that would be required for a fluid to permeate the coating. Particulate zinc as a filler is particularly advantageous because it has yet another corrosion protective function, which is related to its reduction potential. It is known for use in coatings and paints. Use of zinc itself as a protective coating is of course long known, particularly with steel because of its reduction or galvanizing potential.

U.S. Pat. No. 3,201,497 (Heino) describes a thermoset epoxy coating adhesive which can be used as a protective coating, as well as for bonding metals to each other. Metals include steel, aluminum, copper and chromium. The epoxy resin may contain a co-monomer such as glycidyl methacrylate which acts as a 'reactive flexibilizer' during the curing of the resin. A variety of fillers, including zinc dust, may be included in the adhesive composition.

U.S. Pat. No. 3,941,609 (Stern) describes the use of zinc powder, having a controlled size distribution of particles, in paints to provide corrosion protective paints.

Thermoplastic coatings have certain advantages over thermoset resins. They can be less brittle, and have all the advantages of facile application techniques and do not require a separate curing step. On the other hand, thermoplastics have a high coefficient of expansion compared with many thermosets and thus, have had limited utility. One thermoplastic coating is taught in U.K Patent Specification No. 88/20807, published March 1990, which is a priority document for U.S. Pat. No. 5,091,260. The thermoplastic, useful as a sole coating or as a primer coating, is based on mixtures of polyethylene or polypropylene grafted with maleic acid or anhydride containing zinc powder. These thermoplastic coatings may be applied by normal thermoplastic means. These polyolefins grafted with maleic anhydride requires a separate expensive grafting step.

There remains a need for a thermoplastic polymer composition, which functions well as a metal coating and/or metal primer coating, which possess adhesive qualities comparable to thermoset epoxy resins, and is easy to produce and apply to the metal as corrosion protection.

SUMMARY OF INVENTION

It has now been found that it is possible to obtain adhesive and protective qualities without the brittleness and need for cure of a thermoset epoxy in a composition based on a thermoplastic polymer containing a special type of epoxy functionality. The thermoplastic coating of the present invention contains epoxy functionality which does not require cure and does not cause the polymer to become thermoset, yet which provides a high level of corrosion protection, especially to steel.

In the present invention, there is provided a metal coating composition comprising a blend of 18–100 wt. % of an ethylene copolymer comprising 40–95 wt. % ethylene, 0–50 wt. % of a co-monomer selected from vinyl acetate, a $C_3$–$C_{11}$ alkyl acrylate, alkyl methacrylate or alkyl vinyl ether and 2–20 wt. % of glycidyl acrylate, glycidyl methacrylate or glycidyl vinyl ether. Optionally, the composition may contain up to 82 wt. % of a filler, based on the weight of copolymer and filler, especially particulate zinc.

There is further provided according to the present invention, a coated metal consisting of a metal layer where the metal may be iron, steel or aluminum, a primer coating of the metal-coating composition described above, and an outer coating, over the primer, of polyethylene or polypropylene or an ethylene acrylic acid or methacrylic acid ionomer.

DETAILED DESCRIPTION OF INVENTION

The thermoplastic polymer of this invention is an ethylene copolymer with a glycidyl containing co-monomer. This material may be used as a coating alone i.e. a sole coating, especially with a filler, but, since it adheres well to both metal and other ethylene polymers or copolymers, it can serve as a primer coating on metal. An outer coating of ethylene polymer or copolymer may be used over the primer. Preferably, it will be used as a primer. Applications in which the thermoplastic polymer of this invention can be used without an outer coating are those in which mechanical damage to the relatively soft, pliable thermoplastic are unlikely.

The glycidyl containing ethylene copolymers are copolymers comprising 40–95 wt. % ethylene and 2–20 wt. % glycidyl-containing comonomer. Below about 2 wt. % glycidyl-containing co-monomer, there is insufficient epoxy functionality to provide a moisture-resistant, corrosion-resistant bond between the metal and the copolymer. Above 20 wt. %, the copolymer becomes expensive, and can begin to cause fouling during polymerization. The glycidyl-containing co-monomer may be a glycidyl acrylate, glycidyl methacrylate or glycidyl vinyl ether, preferably glycidyl methacrylate.

Preferably a second co-monomer is also present. This second comonomer serves to reduce crystallinity compared with polyethylene homopolymer without the need to increase the level of the relatively expensive glycidyl co-monomer. It may also serve to increase low temperature toughness of the copolymer if the glass transition of its homopolymer is low. These second co-monomers include vinyl acetate and alkyl acrylates, alkyl methacrylates and alkyl vinyl ethers. They may be present up to a level of 50 wt. % on the total monomers in the copolymer. Above this level, they are difficult to incorporate in the copolymerization. An intermediate level of from 5–30 wt. % is preferred. The preferred second co-monomer is n-butyl acrylate, because this monomer forms a low-glass-transition-temperature homopolymer. The glycidyl containing ethylene copolymer is substantially free of hydrolysis product. By substantially free, it is meant that less than 1% of the epoxy groups are hydrated.

These ethylene copolymers may be prepared using well known methods of high-pressure, free-radical, ethylene copolymerization using a continuously stirred reactor, operating under steady-state conditions. Such a process is described in U.S. Pat. No. 3,780, 140, which is hereby incorporated by reference.

Fillers may be present in the ethylene copolymer coatings of this invention. The shape, size, and size distribution all impact the effectiveness of a filler, though, at high levels, the particular characteristics of the filler become less important. Zinc flakes and powder appear to be highly suitable. Small particle size facilitates preparation of uniform coatings. For example the particles are preferably less than about 400 microns maximum diameter, and most preferably less than 45 microns. The copolymer composition may be mixed with the filler using well known melt mixing methods employing extruders or other suitable mixers such as a Banbury or Farrel continuous mixers or roll mills.

The amount of filler, if present, can vary widely. Above about 82% of a particulate filler, based on the weight of copolymer plus filler, properties such as flexibility, ductility, elongation and tensile strength of the filled material drop off rapidly. A small amount of filler (2% and up in some cases, 5% and up in others and 10% and up in still others) may be sufficiently advantageous for some coating environments or end uses, while in other cases high levels (up to about 82%) of a particular filler such as a reducing filler like zinc may be preferable. One skilled in the art will be able to determine if and how much filler is most suitable.

In coating metals with plastic coatings, it is normal to first sandblast the metal and/or clean the metal surface with solvents to help remove grease or oxide layers. In addition, washing with various silanes, such as γ-aminopropyltriethoxysilane, may help in reducing any adverse effect of moisture at the metal/coating interface. Metal pre-treatment is preferred.

The thermoplastic coatings of the present invention may be applied to the metal surface by pressure laminating, vacuum laminating, extrusion coating, flame spraying or any other method suitable for thermoplastic coating. Thicker coatings, which generally provide better protection of the coated metal, can be applied without the problems presented by the brittleness of thermoset epoxy resins. However, coatings as thin as 10 mil (0.25 millimeters) have been found entirely suitable.

EXAMPLES

All percentages in examples are weight percentages.

Sample Preparation and Testing

"Coated Plaques" for testing were prepared in the laboratory as follows:

"Treated Carbon Steel Plates" were made by first sandblasting and then washing with 1,1,1-trichloroethane and then treating with a solution of γ-aminopropyltriethoxysilane in 50/50 ethanol water (0.2–0.4% solution).

If filler was used, it was blended with polymer using a roll mill at a temperature of about 180° C. until a homogeneous blend was obtained (typically about ten minutes).

Polymer mixed with filler, if any, was made into sheets by compression molding, using a hydraulic press at a temperature of about 190° C. and a pressure of about $2.76 \times 10^8$ Pa. to obtain a film of about 10 mil (0.25

The sheet was then laminated to the Treated Carbon Steel Plate by either vacuum forming techniques at 190° C. and a vacuum of $8.94 \times 10^4$ Pa., or by pressing the sheets onto the treated carbon steel plate at 160° C. with minimum pressure for about 3 minutes followed by pressure of $6.9 \times 10^6$ Pa. for 1 minute. If an outer coating was added, a 10 mil coating was laminated on top, using similar techniques, with slight adjustments to the temperature and pressure as appropriate to obtain a suitable outer coating.

Tests

Because of the wide variety of possible uses and environments envisioned for coated metals using the coatings of this invention, no single test is adequate to predict corrosion protecting ability. Several different tests were used to simulate a variety of possible conditions. All Coated Plaques were subjected to a sodium chloride solution or spray at elevated temperatures for varying periods of time, and tested in various ways. The tests used were as follows:

Sodium Chloride Immersion Test

The Coated Plaque was immersed in a either a 5% or a 10% aqueous sodium chloride solution at 70° C. Results appeared to be essentially the same whichever of these two concentrations were used. Adhesion versus time was then measured using the 180° peel test (ASTM D-903). It is believed that materials useful in real-life, end-use conditions will survive with a measurable peel strength under the test conditions for at least 200 hours and preferably much longer. Absolute correlations between test conditions and end-use conditions are of course very difficult to ascertain.

Cathodic Disbondment Test

Because metals, especially steel, are subject to oxide formation and to subsequent galvanic cell formation with release of hydrogen, a useful test using a low voltage applied across Coated Plaques has become common in testing laboratories. In this test, the surface of the Coated Plaque was first cut removing a circle ("holiday") of 0.635 centimeters (cm) in diameter exposing the metal. The Coated Plaque was then placed in a 3% sodium chloride solution at 60° C., and a potential of −1.5 volts was applied across the Coated Plaque. The Coated Plaques were examined after various times, and the loss of adhesion visually observed. Some tests were 48 hr. tests while others were 72 hour tests.

Salt Spray Test

A vertical cut was made in the polymer coating of a Coated Plaque with a knife or scribe until the metal was exposed. The structure was then placed in a vertical position in a salt spray chamber which generates a mist of 5% sodium chloride solution, and kept at 37.8° C. (100° F.) Coated Plaques were examined for loss of adhesion at weekly intervals. The coating was pried back at the scribe to a point where adhesion was still maintained. The distance along the surface of the metal then exposed was measured. Coated Plaques which showed delamination of more than 0.318 cm are considered to have failed.

The following examples illustrate the excellent corrosion resistance of coatings and primers of the present invention.

Comparative Examples 1 and 2

In Comparative Example 1, a 10 mil layer of a blend of 5 wt % zinc powder (Zinc Corporation of America, grade No. 44, which has a size such that 3% or less are retained on a 325 mesh screen), and 95 wt % of an ionomer based on an 85/15 ethylene/methacrylic acid copolymer 57% neutralized with zinc and an MI of 0.8 g./10 min. (as measured with ASTM D-1238 using 2160 g. at 190° C.) was laminated onto a Treated Carbon Steel Plate. In Comparative Example 2, 10 wt % zinc in the same polymer was used. The ionomer/zinc blend coating was the sole coating.

The Coated Plaques were subjected to the Sodium Chloride Immersion Test described above. Peel strength was 1.94 newtons per centimeter (n/cm) after 96 hr. and 0 n/cm after 240 hr. for comparative example 1 and 2.47 n/cm after 96 hr. and 0 n/cm after 240 hr. for comparative example 2. While the higher level of zinc gives a marginal improvement, both the strength and length of time that measurable peel strength was maintained was very low. Thus, while ionomers generally initially adhered well to metal, even with the presence of zinc, they did not provide a coating which provided lasting protection.

Example 1 and 2

A primer coating with a thickness of 10 mil consisting of 5 wt % zinc for Example 1 and 10 wt. % zinc for Example 2 (same grade as in Comparative Examples 1 and 2) in a 63.7/28/8.3 ethylene/n-butyl acrylate/glycidyl methacrylate copolymer with a melt index of 12–15 g./10 min. (as measured with ASTM D-1238 using 2160 g. at 190° C.) was laminated onto a Treated Carbon Steel Plate. A 10 mil thick outer coat which consisted of the ethylene/methacrylic acid based ionomer used in Comparative Examples 1 and 2, but not containing any zinc particles, was then laminated on top of the primer coat. The Coated Plaques were subjected to the Sodium Chloride Immersion Test as in the comparative examples. In Example 1, peel strength was still 30.04 n/cm after 432 hr. while in Example 2, peel strength was 48.6 n/cm after 432 hr. While there may be slight improvement with the higher zinc level in the primer coating, the most dramatic difference is seen when a glycidyl-containing ethylene copolymer is used as a primer.

Comparative Example 3

A Coated Plaque was prepared using the Treated Carbon Steel Plate and a 10 rail coating of the ionomer of the above examples containing 70 wt. % zinc dust (same grade as above). The Coated Plaque was tested using the Cathodic Disbondment Test. Total disbondment occurred after 48 hr. even when a high level of zinc dust was present.

Example 3

A Coated Plaque was prepared using a 10 mil coating of 63.7/28/8.3 weight ratio ethylene/n-butyl acrylate/glycidyl methacrylate containing 65 wt. % of zinc flakes having an average particle size of 840 microns, and a further 10 mil coating of linear low density polyethylene which was grafted with 0.8 wt % maleic anhydride. It was tested using the Cathodic Disbondment Test. After 72 hr., only 3.1 mm. disbondment from the edge of the holiday was present. This test is a severe test, and a high level of zinc was used. It is clear, however, that when there is a glycidyl-containing ethylene copolymer coated directly on the metal surface, a significant level of disbondment protection occurs.

Examples 4 and 5

Coated Plaques were prepared as in Example 1 using a primer coating of the same ethylene/n-butyl acrylate/glycidyl methacrylate terpolymer containing 65 axed 80 wt. % zinc flakes (same as for Example 3), for Examples 4 and 5, respectively, and a topcoat of the same ionomer as for Example 1. The Coated Plaques were subjected to the Salt Spray Test described above. The Coated Plaques were still showing no delamination from the scribe mark even after 5000 hours. This is regarded as an excellent level of resistance. Comparable coatings based on ionomer filled with a similar level of zinc will fail within 24 hours.

I claim:

1. A method of protecting iron, steel or aluminum against corrosion which comprises applying directly on the metallic surface a blend of (i) 18–98 wt. % of an ethylene copolymer substantially free of any hydration product of the ethylene copolymer, the ethylene copolymer comprising;
(a) 40–95 wt. % of ethylene,
(b) 0–50 wt. % of a comonomer selected from the group consisting of vinyl acetate, $C_3$—$C_{11}$ alkyl acrylate or methacrylate, and $C_3$–$C_{11}$ alkyl vinyl ether and
(c) 2–20 wt. % of glycidyl acrylate, glycidyl methacrylate or glycidyl vinyl ether and (ii) 2–82 wt. % of a filler of particulate zinc.

2. The method of claim 1 wherein (b) is n-butyl acrylate and (c) is glycidyl methacrylate.

3. The coating of claim 1 in which (a) is present at a level of 45–90 wt. %, (b) is present at a level of 5–30 wt. % (c) is present at a level of 5–10 wt. %.

* * * * *